E. LAKING.
CORN HARVESTING MACHINE.
APPLICATION FILED MAR. 11, 1909.
927,660.
Patented July 13, 1909.
2 SHEETS—SHEET 1.
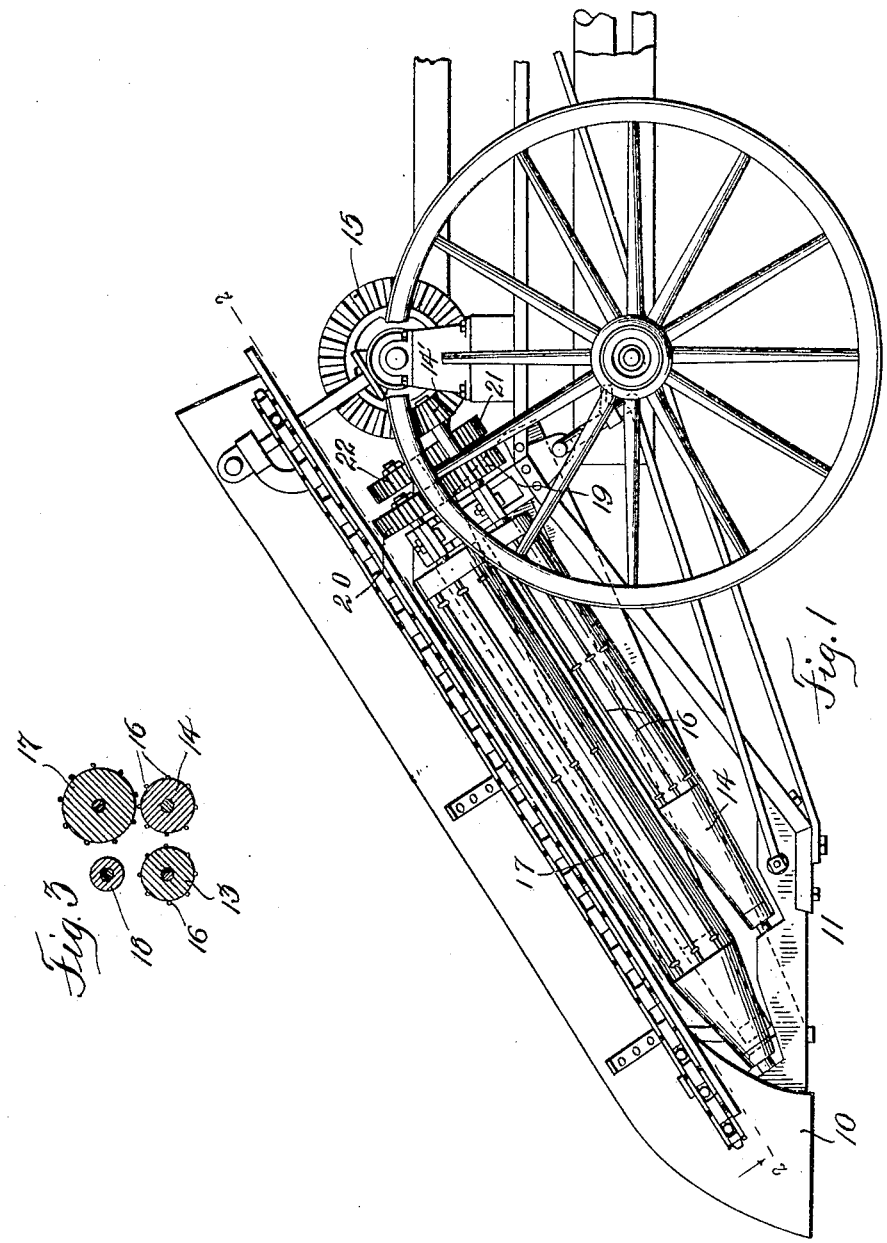

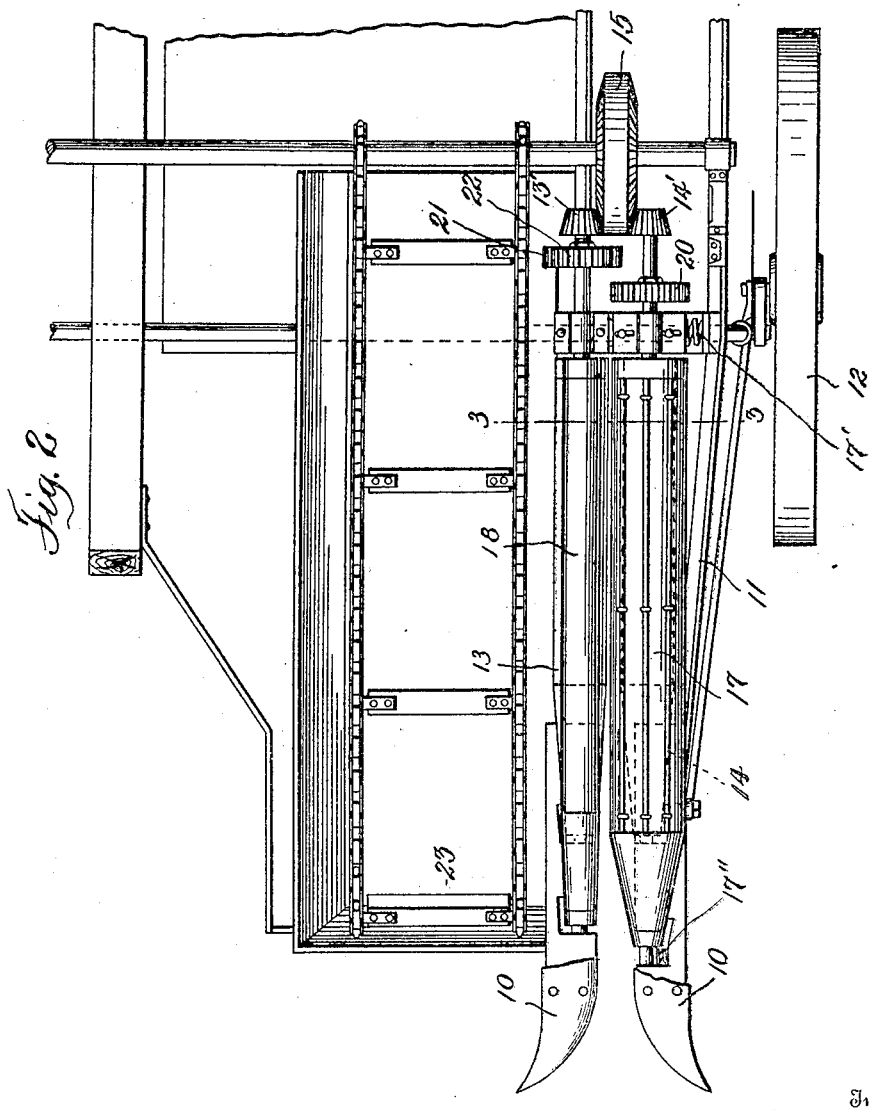

UNITED STATES PATENT OFFICE.

EDMUND LAKING, OF GRANT PARK, ILLINOIS, ASSIGNOR OF ONE-FIFTH TO EDMUND LAKING, JR., AND ONE-FIFTH TO DUNCAN LAKING, BOTH OF DANVILLE, ILLINOIS, AND ONE-FIFTH TO ZENO LAKING AND ONE-FIFTH TO FRANK LAKING, BOTH OF CHICAGO HEIGHTS, ILLINOIS.

CORN-HARVESTING MACHINE.

No. 927,660.      Specification of Letters Patent.      Patented July 13, 1909.

Application filed March 11, 1909. Serial No. 482,749.

*To all whom it may concern:*

Be it known that I, EDMUND LAKING, a citizen of the United States, residing at Grant Park, in the county of Kankakee and State of Illinois, have invented certain new and useful Improvements in Corn-Harvesting Machines, of which the following is a specification.

This invention relates to machinery for harvesting corn, and has particular reference to a machine of this class which is designed to snap and gather the ears of corn directly from the stalks and without removing the stalks from the land on which they grow.

For a full understanding of the invention, reference is to be had to the following detail description and to the accompanying drawings, in which—

Figure 1 is a side elevation of the principal portions of the invention; Fig. 2 is a view taken substantially on the line 2—2 of Fig. 1; Fig. 3 is a transverse section on the line 3—3 of Fig. 2.

Throughout the following detail description, and on the several figures of the drawings, similar parts are referred to by like reference characters.

In machines of this class it is customary for the harvester to be drawn or propelled across the field by any suitable means, and in such a manner as to cause a row of corn to be straddled and caused to be gathered between a pair of guards 10, having outwardly flaring points or noses, whereby tangled or lodged stalks will be brought therebetween. Said guards 10 are carried by any suitable form of frame work 11 mounted upon supporting wheels 12, only one of which is illustrated.

A plurality of coöperating rollers are journaled in any suitable manner in the frame 11. Said rollers are preferably all parallel, but are of different sizes and are operated at different speeds, as will be hereinafter fully set forth. Two of the rollers, 13 and 14, which may be called gripping rollers are journaled beneath the other two and are driven in opposite directions by pinions 13' and 14' connected thereto and driven from a double faced bevel gear 15, driven either from the bull-wheel of the machine or from any other suitable source of power. Said rollers 13 and 14 are driven in such a direction as to cause their adjacent faces to move downwardly. Said faces are provided with a series of longitudinal ribs 16, consisting of bars of iron and secured thereto in any suitable manner. Said bars constitute a means for providing an effective grip of the rollers upon the corn stalks, insuring that the latter will be drawn downwardly thereby with sufficient rapidity to prevent the stalks from being pulled from the ground. The rollers 17 and 18 are located above the rollers 14 and 13, respectively, and are driven therefrom by sets of spur gears. The axle of the roller 14 is provided with a gear 19 which drives a gear 20 connected to the roller 17, and the axle of the roller 13 is provided with a gear 21 which drives a gear 22 of the upper roller 18. The pinions 13' and 14' are of the same size and also the rollers 13 and 14 are the same size, hence the speed of rotation of the same will be identical. The roller 17 is preferably slightly larger than the roller 14 and the gears 19 and 20 are preferably of the same size, hence the surface speed of the roller 17 will be greater than that of the rollers 13 and 14.

From the construction thus far described it will be understood that the rollers 17 and 18 will be driven in opposite directions from each other, and also each of them will be driven in a direction opposite from that in which the roller beneath it will be driven. The rollers 17 and 18 may be called snapping rollers and the adjacent faces thereof will be caused to move upwardly and whereby the ears of corn may be snapped or pulled from the stalks while the latter are moving downwardly, and the ears, by reason of the fact that the roller 17 is larger or extends above and operates at a more rapid speed than the roller 18, will be thrown over the roller 18 upon a carrier or conveyer 23, which will operate to elevate the same to that portion of the machine where will be provided any suitable form of husking apparatus, not shown, or to any suitable receptacle provided therefor. The surface velocity of the roller 18 will be determined by the relative sizes of the gears 21 and 22 and by the proportionate diameters of said rollers. It is preferred that the gear 22 be smaller than the gear 21 and also that the roller 18 be sufficiently smaller than the roller 13 so as to provide that the surface velocity of the roller 18 will be slightly less than that of the roller 13. In this connection it is desired not to be limited to the exact sizes of gears or rollers, and that the same may be modified as desired within the spirit of the invention.

The roller 17 is preferably mounted so as to yield to the contact therewith of stalks of large size, and yet it is intended to be maintained substantially close to the roller 18 to prevent the passage of ears of corn between the rollers 17 and 18. To this end the roller 17 is shown as being supported by springs 17′ and 17″.

Having thus described the invention, what is claimed as new is:

1. In a corn harvester, the combination of a frame, a plurality of sets of rollers journaled therein in substantially parallel relation, two of said rollers constituting gripping rollers, sets of longitudinal rods secured to the faces of said gripping rollers, means to drive said gripping rollers in opposite directions and so that their adjacent faces will move downwardly, a pair of snapping rollers mounted above the gripping rollers, the snapping rollers being of different sizes and operated simultaneously in opposite directions from the gripping rollers, and an elevator for the ears of corn received from the rollers.

2. In a corn harvester, the combination of a frame, a pair of gripping rollers journaled therein, means for driving said rollers in opposite directions at the same speed, a pair of snapping rollers journaled substantially parallel and above the gripping rollers, means operative from the gripping rollers to drive the snapping rollers in opposite directions from each other and from the gripping rollers, the outer snapping roller extending above the other snapping roller and driven at a higher surface velocity, and an elevator to convey the ears of corn after being received thereby.

In testimony whereof I affix my signature in presence of two witnesses.

EDMUND LAKING.

Witnesses:
A. T. PLANT,
C. J. HAYDEN.